United States Patent [19]

Kozaki et al.

[11] 4,408,837

[45] Oct. 11, 1983

[54] ANTIREFLECTION, LIQUID CRYSTAL, ELECTRODE AND NONCONDUCTIVE LAYER

[75] Inventors: Syuichi Kozaki, Nara; Fumiaki Funada, Yamatokoriyama; Shigehiro Minezaki, Ikoma, all of Japan

[73] Assignee: Sharp Kabushiki Kaisha, Osaka, Japan

[21] Appl. No.: 277,847

[22] Filed: Jun. 26, 1981

[30] Foreign Application Priority Data

Jun. 26, 1980 [JP] Japan ................................. 55-87619

[51] Int. Cl.$^3$ ............................................... G02F 1/13
[52] U.S. Cl. ..................................... 350/336; 350/338; 350/339 R
[58] Field of Search ..................... 350/336, 338, 339 R

[56] References Cited

U.S. PATENT DOCUMENTS

| | | | |
|---|---|---|---|
| 3,814,501 | 8/1974 | Schindler | 350/338 |
| 4,217,035 | 8/1980 | Doriguzzi et al. | 350/338 |
| 4,248,502 | 2/1981 | Bechteler et al. | 350/339 R X |

*Primary Examiner*—John K. Corbin
*Assistant Examiner*—David Lewis
*Attorney, Agent, or Firm*—Birch, Stewart, Kolasch and Birch

[57] ABSTRACT

A liquid crystal cell comprising a pair of opposing supports one carrying a patterned electrode and the other carrying a counter electrode placed vis-a-vis with the patterned electrode and a liquid crystal material sandwiched between the two electrodes, wherein at least the patterned electrode comprises an $In_2O_3$ coating and a remaining portion of the support where the $In_2O_3$ coating is not disposed comprises a $CeO_2$ coating whose refractive index is substantially equal to that of the $In_2O_3$ coating.

4 Claims, 5 Drawing Figures

(A)  (B)

ANTIREFLECTION, LIQUID CRYSTAL, ELECTRODE AND NONCONDUCTIVE LAYER

BACKGROUND OF THE INVENTION

This invention relates to an improvement in liquid crystal cells which display a predetermined pattern.

The conventional liquid crystal cell generally comprises a pair of transparent supports typically of a transparent glass sheet, each inner surface of the transparent suppoorts carrying a transparent conductive coating of a desired display pattern and an overlying transparent insulating coating for controlling molecular alignment in a layer of liquid crystal composition. The two transparent supports are held such that the inner surfaces of the two transparent supports are opposed in parallelism via spacers to define a cavity in which the liquid crystal composition is injected.

However, under non-electric field condition or when no voltage is applied between electrodes on the two transparent conductive coatings in the conventional liquid crystal cell, the shadow of the display pattern stands out in strong relief. Another disadvantage is that the display pattern is somewhat unclear and contrast is poor when a given voltage is applied between the two transparent conductive coatings to display the desired pattern. As a consequence of the inventors' effort to find the cause of the above discussed disadvantages, the inventors revealed that there is an appreciable difference in refractive index between the transparent conductive coating forming the display pattern and the transparent insulating coating in contact with the transparent conductive coating and extraordinal reflected light appears at the boundary between the transparent coductive coating and the transparent insulating coating.

OBJECTS AND SUMMARY OF THE INVENTION

Accordingly, it is an object of the present invention to provide an improved liquid crystal cell which is free of the above discussed disadvantages. According to the inventors' findings, a transparent conductive coating of $In_2O_3$ (including $SnO_2$ as an addition agent) with a desired display pattern is disposed on a transparent support and a transparent insulating coating of $CeO_2$ whose refractive index is substantially equal to that of the transparent conductive coating is disposed on a portion of the transparent support where the transparent conductive coating is not disposed. The $CeF_3$ content of the $CeO_2$ coating is so controlled that the thickness of the $CeO_2$ coating is substantially equal to that of the transparent conductive coating. The result is that in a liquid crystal cell the shade of pattern electrodes on the transparent conductive coating does not stand in relief and the display pattern is made very clearly viewable with the human's eyes.

BRIEF DESCRIPTION OF THE DRAWINGS

For a more complete understanding of the present invention and for further objects and advantages thereof, reference is now made to the following description taken in conjunction with the accompanying drawings, in which.

DETAILED DESCRIPTION OF THE INVENTION

Figure 1:
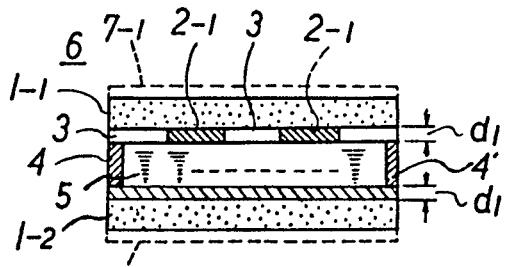
FIG. 1 is a cross sectional view of a liquid crystal structure according to an embodiment of the present invention.

Referring now to FIG. 1, there is illustrated a pair of rectangular soda glass supports 1-1 and 1-2 each having a refractive index $n_0$. On an inner surface of one of the transparent supports 1-1 there is disposed a transparent coductive coating 2-1 which has a "日"-shaped pattern, for example, and a thickness $d_1$ and a refractive index $n_1$. On a portion of the transparent support where the pattern electrodes are not disposed, there is disposed a transparent insulating coating 3 which has the same thickness $d_1$ as that of the transparent conductive coating 2-1 and a refractive index $n_1'$ substantially equal to the above refractive index. For instance, the transparent conductive coating 2-1 may comprise an indium oxide $In_2O_3$ having a refractive index of 1.80 and containing 5.0 weight percent of a tin oxide $SiO_2$, while the transparent insulating coating 3 comprises $CeO_2$ with 20.0 wt % of $CeF_3$ by vacuum deposition using a tungusten boat so as to exhibit a refractive index of 1.80. Both the transparent conductive coating 2-1 and the transparent insulating coating 3 are of a thickness of 300 Å (angstrom).

On an inner surface of the other transparent support 1-2 there is disposed a transparent conductive coating which serves as a counter electrode opposing against and common to the pattern electrodes on the transparent support 1-1 and has the same thickness $d_1 = 300$ Å as that of the transparent coating 2-1.

A large number of grooves are formed on the surfaces of the transparent conductive coating 2-1 and the transparent insulating coating 3 on the transparent support 1-1 and the surface of the transparent conductive coating 2-2 on the transparent support 1-2, which extend in directions normal to each other for governing the alignment of the logitudinal axe of liquid crystal molecules therealong, relying upon rubbing procedure using a polishing cloth, although not shown in the drawings.

The two transparent supports 1-1 and 1-2 are adhered via spacers 4 and 4' so that the rubbed surfaces thereof are disposed in parallelism with a predetermined spacing. A layer of liquid crystal composition 5 such as nematic liquid crystal is injected into a cavity defined between the two transparent supports 1-1 and 1-2 to complete the manufacture of a liquid crystal cell 6. The liquid crystal molecules in contact with the transparent conductive coating 2-1 and the transparent insulating coating 3 on the transparent support 1-1 and the transparent conductive coating 2-2 on the support 1-2 are therefore aligned along the direction of rubbing while twisting by an angle of 90° from the rubbed surfaces of the transparent conductive coating 2-1 and the transparent insulating coating 3 to the other transparent coductive coating 2-2.

The resultant liquid crystal cell 6 is flanked with a pair of polarizers 7-1 and 7-2 in a vertical direction as shown by the dot line, thus resulting in a liquid crystal display panel of the TN-FEM type (twisted nematic electric field drive type). It is noted that the two polarizers 7-1 and 7-2 are disposed to utilize ordinal light with its polarization axes being normal to the direction of rubbing of the transparent supports 1-1 and 1-2.

Matter-of-factly, when the above described liquid crystal display panel is driven, the pattern electrodes suffering from no electric field or applied voltage between the transparent coatings 2-1 and 2-2 never stand in strike relief. Furthermore, when a desired voltage is applied between the pattern electrodes on the transparent conductive coating 2-1 and the transparent conductive coating 2-2, a very clear display appears on the pattern electrodes.

Figure 2:
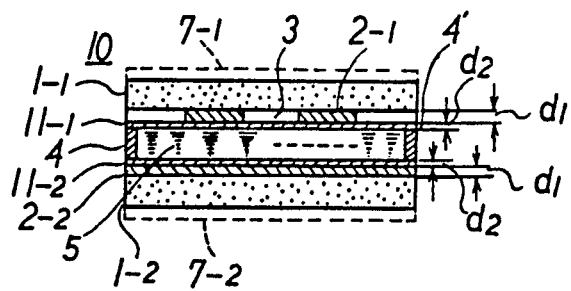
FIGS. 2 and 3 are cross sectional views of other embodiments of the present invention.

FIG. 2 shows another embodiment of the present invention. A liquid crystal cell 10 of FIG. 2 further includes transparent insulating coatings 11-1 and 11-2 having a desired thickness $d_2$ and a refractive index $n_2$, respectively, disposed on the transparent conductive coating 2-1 and the transparent insulating coating 3 on the inner surface of the one transparent support 1-1 and the transparent conductive coating 2-2 on the other support 1-2. Respective surfaces of the two trasparent insulating coatings 11-1 and 11-2 are similarly subjec to rubbing. Otherwise, the liquid crystal cell of FIG. 2 is substantially similar to that in FIG. 1 with the same reference numbers.

The materials and thicknesses of the constitutional elements 1-1, 1-2, 2-1, 2-2, 3, 5, 11-1 and 11-2 of the liquid crystal cell 10 and the wavelength $\lambda$ of light for illumination of the pattern electrodes are selected as follows to meet the following equation (I):

$$n_1 \cdot d_1 \simeq n_2 \cdot d_2 \simeq \lambda/4$$

$$n_1^2 \cdot n_4 \simeq n_0 \cdot n_2^2 \quad \text{(I)}$$

where $\lambda$ is the wavelength of light for illumination of the display pattern to be displayed, $n_4$ is the refractive index of the liquid crystal material 5, $d_1$ is the thickness of the transparent conductive coating 2-1, the transparent insulating coating 3 and the transparent conductive coating 2-2, $n_1$ is the refractive index of these coatings 2-1, 3 and 2-2, $d_2$ is the thickness of the transparent insulating coatings 11-1 and 11-2 and $n_3$ is the refractive index of these coatings 11-1 and 11-2.

The equation (I) is derived from theoretical calculation, showing the critical condition by which to minimize reflected light at the boundary between the trasparent support 1-1 and the transparent conductive coating 2-1 and the transparent insulating coating 3, that between the transparent support 1-2 and the transparent conductive coating 2-2 and those between the liquid crystal layer 5 and the respective transparent insulating coatings 11-1 and 11-2.

Actually, the wavelength $\lambda$ of light for pattern displaying purposes is selected to be 5500 Å based upon a visibility curve resulting from the inventors' experiments in order to ensure the most desirable visibility.

The transparent conductive coatings 2-1 and 22 comprise indium oxide $In_2O_3$ with 5.0 w% of tin oxide $SnO_2$ to thereby exhibit a refractive index of $n_1 = 1.80$. The transparent insulating coating 3 is made to have a refractive index $n_1' = 1.80$ by depositing $CeO_2$ with 25.0 w% of $CeF_3$ in vacuum deposition manner using a tungsten (W) boat. The thickness of these coatings 2-1, 3 and 2-2 is selected to be $d_1 = 750$ Å. Both the transparent supports 1-1 and 1-2 are set up by soda glass having a refractive index $n_0 = 1.52$. The liquid crystal material 5 comprises product number "ROTN-403" by Roche. In addition, likewise the transparent insulating coating 3 having the refractive index $n_2 = 1.80$ the transparent insulating coatings 11-1 and 11-2 include $CeO_2$ with 25.0 wt% of $CeF_3$ with the result in a thickness of 750 Å.

The refractive index $n_4$ of the liquid crystal 5 when being driven is 1.52 and the resultant liquid crystal cell 10 meets the requirements of equation (I).

The respective surfaces of the transparent insulating coatings 11-1 and 11-2 of the above described liquid crystal display cell 10 are subject to rubbing in directions normal to each other for restricting the alignment of the longitudinal axes of the liquid crystal molecules and the cell 10 is flanked in a vertical direction with polarizers 7-1 and 7-2 lying over the transparent supports 1-1 and 1-2, with its polarization axes being normal to the direction of rubbing the trasparent supports 1-1 and 1-2 as depicted by the dot line, thus completing the manufacture of a TN-FEM type liquid crystal display panel.

The results of the inventors' experiments indicate that, when the above described liquid crystal display panel is driven and a desired voltage level is applied between selected ones of the pattern electrodes on the transparent conductive coating 2-1 and the transparent conductive coating 2-2 or the common electrode, no reflected light appears at the boundary between a portion of the transparent support 1-1 corresponding to the selected pattern electrodes and the transparent conductive coating 2-1 and the transparent insulating coating 3, that between the selected pattern electrodes on the transparent conductive coating 2-2 and the transparent support 2-2 and that between a portion of the liquid crystal layer 5 corresponding to the selected pattern electrodes and the two transparent insulating coatings 11-1 and 11-2, thus providing a pattern display with remarkable high contrast. In a manner similar to the liquid crystal cell 6, the pattern electrodes on the transparent conductive coatings 2-1 and 2-2 where no electric field is developed is not viewed as floating.

Figure 3:
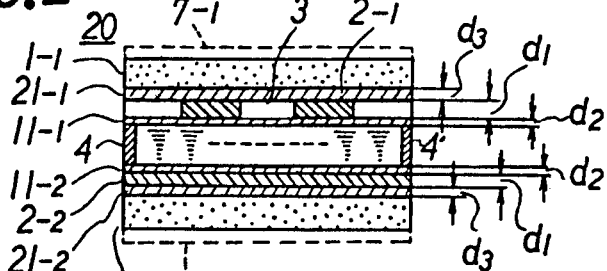

FIG. 3 shows still another embodiment of the present invention. The distincitons of the liquid crystal cell 20 of FIG. 3 over the above illustrated cell 10 are that the former further includes transparent insulating coatings 21-1 and 21-2 having a desired refractive index $n_3$ and a desired thickness $d_3$, respectively, disposed between the inner surface of the transparent support 1-1 and the pattern-displaying transparent conductive coating 2-1 and the transparent insulating coating 3 and between the inner surface of the transparent support 1-2 and the common electrode transparent conductive coating 2-2. Otherwise, the liquid crystal cell of FIG. 3 is substantially similar to that in FIG. 2 with the same reference numbers.

The materials and thicknesses of the constitutional elements 1-1, 1-2, 2-1, 2-2, 3, 5, 11-1, 11-2, 21-1 and 21-2 of the liquid crystal cell 20 and the wavelength $\lambda$ of light for illumination of the pattern electrodes are selected as follows to meet the following equation (II):

$$n_1 \cdot d_1 \simeq n_2 \cdot d_2 \simeq n_3 \cdot d_3 \simeq \lambda/4$$

$$n_0 \cdot n_1^2 \cdot n_4 \simeq n_2^2 \cdot n_3^2 \quad \text{(II)}$$

The above defined equation (II) like equation (I) is derived from theoretical calculation, showing the critical condition by which to minimize reflected light at the boundary between the transparent support 1-1 and the transparent conductive coating 21-1, that between the transparent insulating coating 21-1 and the transparent conductive coating 2-1 and the transparent insulating coating 3, that between the transparent support 1-2 and the transparent conductive coating 21-2, that between the transparent insulating coating 21-2 and the transparent conductive coating 2-2 and those between the liquid crystal layer 5 and the respective transparent insulating coatings 11-1 and 11-2.

Actually, the wavelength λ of light for pattern displaying purposes is selected to be 5500 Å in a manner similar to the liquid crystal cell 6. The liquid crystal material 5 comprises product number "ROTN-403" by Roche. Both the transparent supports 1-1 and 1-2 are set up by soda glass having a refractive index $n_0 = 1.52$. The transparent insulating coatings 21-1 and 21-2 typically comprise niobium oxide $Nb_2O_5$ having a refractive index of $n_3 = 1.90$ and a thickness of $d_3 = 700$ Å. The transparent conductive coatings 2-1 and 22 typically comprise indium oxide $In_2O_3$ with 5.0 w% of tin oxide $SnO_2$ to thereby exhibit a refractive index of $n_1 = 1.80$. In addition, the transparent insulating coating 3 is made to have a refractive index $n_1' = 1.80$ by depositing $CeO_2$ with 25.0 w% of $CeF_3$ in vacuum deposition manner. The thickness of these coatings is selected to be 750 Å. In addition, the transparent insulating coatings 11-1 and 11-2 include silicon oxide $SiO_2$ with a thickness of 900 Å and a refractive index of $n_2 = 1.47$. the refractive index $n_4$ of the liquid crystal 5 when being driven is 1.52 and the resultant liquid crystal cell 20 meets the requirements of equation (II).

The respective surfaces of the transparent insulating coatings 11-1 and 11-2 of the above described liquid crystal display cell 20 are subject to rubbing in directions normal to each other for restricting the alignment of the liquid crystal molecules and the cell 20 is flanked in a vertical direction with the polarizers 7-1 and 7-2 lying over the transparent supports 1-1 and 1-2, with its polarization axes being normal to the direction of rubbing the trasparent supports 1-1 and 1-2 as depicted by the dot line, thus completing the manufacture of a TN-FEM type liquid crystal display panel.

The results of the inventors' experiments indicate that, when the above described liquid crystal display panel is driven and a desired voltage level is applied between selected ones of the pattern electrodes on the transparent conductive coating 2-1 and the transparent conductive coating 2-2, no reflected light appears at the boundary between selected ones of the pattern electrodes on the transparent conductive coating 2-1 and the transparent insulating coating 3 and the transparent insulating coating 21-1, that between the transparent insulating coating 21-1 and the transparent support 1-1, that between the selected pattern electrodes on the transparent conductive coating 2-2 and the transparent insulating coating 21-1, that between the transparent insulating coating 21-2 and the transparent support 1-2 and that between a portion of the liquid crystal layer 5 corresponding to the selected pattern electrodes and the two transparent insulating coatings 11-1 and 11-2, thus providing a pattern display with remarkable high contrast. In a manner similar to the liquid crystal cells 6 and 10, the pattern electrodes on the transparent conductive coatings 2-1 where no electric field is developed is not viewed as floating.

It is evident from the foregoing that it becomes easy to select proper material for the transparent insulating coatings 11-1 and 11-2 in contact with the liquid crystal layer 5 as an alignment film governing the alignment of the longitudinal axes of the liquid crystal molecules in a predetermined direction, for example, proper material most suitable for rubbing, and to reduce manufacturing cost by providing the transparent insulating coatings 21-1 and 21-2, respectively, between the transparent support 1-1 and the pattern electrode transparent conductive coating 2-1 and the transparent insulating coating 3 and between the transparent support 1-2 and the common electrode transparent conductive coating 2-2 and selecting the material of the transparent insulating coating 21-1 especially its refractive index $n_3$ and thickness $d_3$ in the above described manner.

Although the present invention has been described and shown with respect to the liquid crystal display cells 6, 10 and 20, it is also applicable to other types of liquid crytal cells for preventing the pattern electrodes from being viewed as floating under no electric field condition and providing a very clear and high contrast display under electric field condition.

Table 1 enumerates the refractive indexes of the coatings including $CeO_2$ and $CeF_3$.

TABLE 1

| $CeF_3$ CONTENT (%) | 50.0 | 30.0 | 25.0 | 20.0 | 15.0 |
|---|---|---|---|---|---|
| REFRACTIVE INDEX | 1.67 | 1.72 | 1.79 | 1.80 | 1.84 |
| THICKNESS (Å) | 750 | 750 | 750 | 300 | 300 |
| DEPOSING RATE (Å/sec) | 1.25 | 0.75 | 0.94 | 0.75 | 0.75 |

Figure 4:
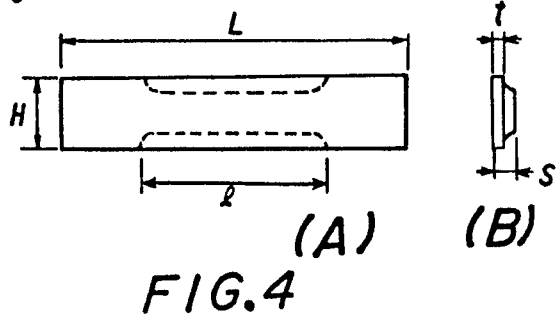
FIGS. 4A and 4B are views showing the shape of a W boat used for vacuum deposition of a $CeF_3CeO_2$ coating.

Deposition was carried out with a vacuum degree of $3 \times 10^{-4}$ torr, $O_2$ atmosphere while a substrate was heated to 250° C. The formation of the $CeF_3$-$CeO_2$ coatings relied upon resistive heating using the tungesten boat as shown in FIG. 4 wherein S=2.0 mm, t=0.1 mm, H=10.0 mm, L=100.0 mm, l=50.0 mm and 0.8 g of $CeF_3$-$CeO_3$ was mounted in the boat.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A liquid crystal cell comprising:
   a pair of opposing supports one carrying a patterned electrode and the other carrying a counter electrode placed vis-a-vis with the patterned electrode; and
   a liquid crystal material sandwiched between the two electrodes,
   wherein at least the patterned electrode comprises an $In_2O_3$ coating and a remaining portion of the support where the $In_2O_3$ coating is not disposed comprises a $CeO_2$ coating whose refractive index is substantially equal to that of the $In_2O_3$ coating.

2. A liquid crystal cell according to claim 1 wherein an anti-reflection transparent insulating coating is disposed on the side where said $In_2O_3$ coating and said $CeO_2$ coating.

3. A liquid crystal cell according to claim 1 or 2 wherein a transparent insulating coating is disposed between said $In_2O_3$ and $CeO_2$ coatings and said support.

4. A liquid crystal cell according to claim 1, wherein the $CeO_2$ coating includes $CeF_3$ as an additional agent.

* * * * *